Figure 1:
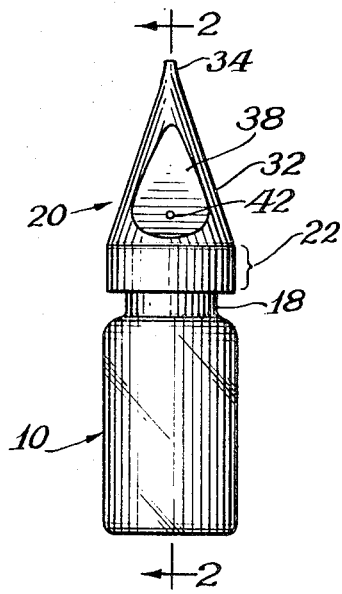
Figure 2:
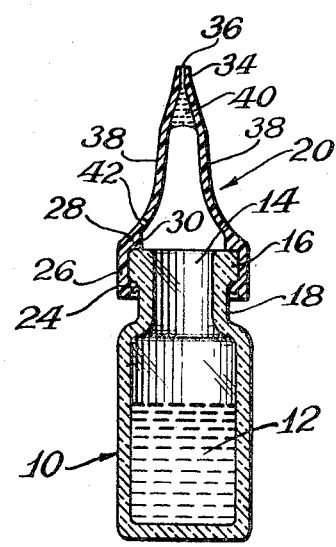
Figure 3:
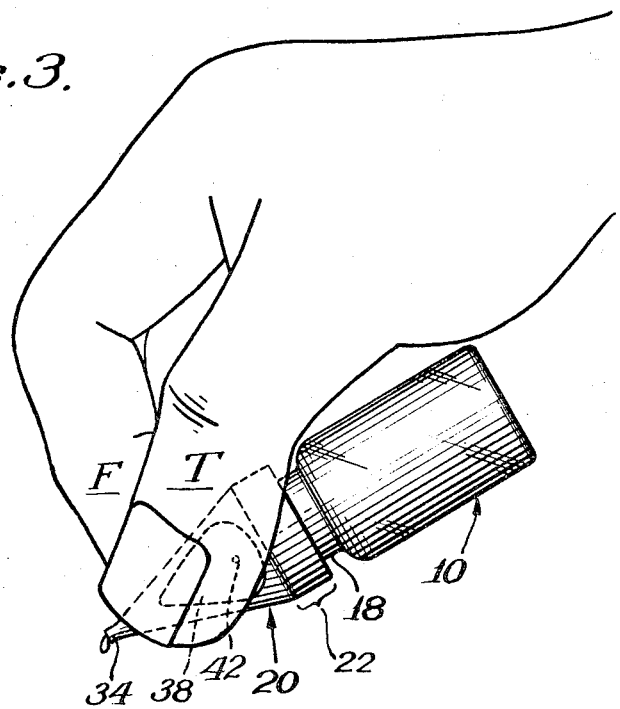

United States Patent

[11] 3,552,605

| [72] | Inventor | Gary L. Hein |
| | | Decatur, Ill. |
| [21] | Appl. No. | 758,409 |
| [22] | Filed | Sept. 9, 1968 |
| [45] | Patented | Jan. 5, 1971 |
| [73] | Assignee | Lincoln Laboratories, Inc. |
| | | Decatur, Ill. |
| | | a corporation of Indiana |

[54] DROP DISPENSER WITH VENT
2 Claims, 3 Drawing Figs.

[52] U.S. Cl. .................................................. 222/207,
222/420, 222/479, 222/490
[51] Int. Cl. .................................................. B65d 37/00
[50] Field of Search .......................................... 222/213,
215, 207, 429, 422, 420, 490, 494, 479

[56] References Cited
UNITED STATES PATENTS

| 2,579,718 | 12/1951 | Wolman | 222/215 |
| 2,609,972 | 9/1952 | Szekely | 222/422X |
| 2,679,336 | 5/1954 | Frick | 222/494X |
| 3,179,301 | 4/1965 | Lucht | 222/213 |
| 3,248,017 | 4/1966 | Allen | 222/420X |

*Primary Examiner*—Stanley H. Tollberg
*Assistant Examiner*—Norman L. Stack, Jr.
*Attorney*—Norman Lettvin ABSTRACT: A manually operable drop dispenser for biological fluids is provided by a conical plastic cap having a restricted drop defining tip at its apex and shaped to provide flattened, opposed pinch surfaces intermediate the ends of the cap. A closable vent hole is provided in one of the two pinch surfaces and operates to vent expanding heated air from within the cap so as to prevent inadvertent discharge of liquid that is retained in the restricted drop-defining tip of the dispenser.

PATENTED JAN 5 1971

3,552,605

Inventor:
Gary L. Hein

By Bair, Freeman & Molinare
Attys.

3,552,605

DROP DISPENSER WITH VENT

BACKGROUND OF THE INVENTION

This invention relates to a drop dispenser and more particularly to a dispenser for effecting selectively controlled dispensing of very small amounts of a liquid biological.

Manual dispensing of minute amounts of liquids, such as liquid biologicals, is frequently desired. See Hein U.S. Pat. No. 3,325,059 and Danish Pat. No. 82,714. However, where a very restricted bore is provided for metering the liquid passing therethrough under manual pressure, certain problems arise in providing a structure which is sensitive to the manual forces applied so as to yield a high degree of "feel" to the person doing the dispensing. Furthermore, where the liquid is to be refrigerated prior to uses, such as with certain types of biologicals such as smallpox vaccine for an example, a problem arises that after a use a residue amount of liquid is trapped at the dispensing tip and when a refrigerated vial is taken into room temperature for the next use, the expanding air in the vial frequently operates to expel a portion of said residue inadvertently.

Thus, one object of this invention is to provide an improved drop dispenser constructed to provide thereon manual manipulation means which are to be pinched between two fingers for purposes of effecting controlled dispensing of a very small amount of liquid while giving to the operator a high degree of "feel".

Another object of this invention is to provide a drop dispenser which avoids inadvertent discharge of liquid therefrom in the event of thermal expansion of trapped gas or air in the liquid container.

A further object of this invention is to provide a drop dispenser that is characterized by its simplicity and inexpensiveness of construction and by its efficiency and ease of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

BRIEF DESCRIPTION OF THE DRAWINGS

FIG. 1 is a side elevational view of a container for liquid with a drop dispensing cap thereon constructed in accord with my invention;

FIG. 2 is a vertical cross-sectional view taken on line 2–2 of FIG. 1; and

FIG. 3 is a view illustrating the manner of holding the dispenser of FIGS. 1 and 2 during a drop-dispensing operation.

DESCRIPTION OF THE PREFERRED EMBODIMENTS

Referring now to the drawings, there is shown in the FIGS. a rigid glass vial or container 10 of the type normally used for storage therein of liquid biologic material 12. The glass vial 10 has an open mouth 14 at the upper end surrounded by an outwardly facing annular lip or bead 16 with an indented neck or annular recess 18 below the bead 16. The vial 10 of FIGS. 1 and 2 has attached to the upper end thereof a spout-like dispenser 20 embodying the features of this invention.

The dispenser 20 is an elongated molded body having the shape shown and formed of a plastic material such as polyolifin, e.g., polyethylene or polypropylene, that is shape maintaining but somewhat flexible and resilient. The lower end of dispenser body 20 is shaped to define a bead-embracing annular 22 which includes an inturned flange or bead 24, for entry into recess 18 immediately below vial lip 16, an outer cylindrical wall portion 26 disposed closely adjacent the outer surface of vial lip 16, and an annular abutment fillet 28 for rigidifying the upper end of annulus 22 and providing an annular shoulder 30 for engagement with the outermost surface of vial lip 16. This close-fit construction permits of a pressure-type snapfit of the dispenser 20 onto the vial 10 and provides such excellent sealing therebetween that there is no chance for leakage through the connection despite the forces applied in the pressurizing pinching of the uppermost portion of the dispenser 20 as is required to effect dispensing of liquid as hereinafter described.

The spout portion 32 of located above annulus 22 is generally right-circular, cone-shaped and elongated, as seen in the elevational view of FIG. 1, terminating in a discharge tip at the upper apex or distal end of the spout. Said discharge tip is defined by a tubular drop-defining extension 34 with a restricted bore 36 therethrough. The spout walls of dispenser 20 are provided with two opposed portions 38 which, as best seen in FIG. 2, are flattened, and are also indented toward each other relative to a projection of the normal right-cylindrical conical periphery of spout wall 32. The wall portions 38 are preferably thinned, relative to the wall portions of the remainder of spout 32, so as to be more responsive to manual pressure. As seen in FIG. 1, the wall portions 38 are generally triangular in shape and are generally flat in their uppermost reaches but curve slightly adjacent their lower ends just above annulus 22. These flattened opposed portions 38 provide planar pinch-surfaces that are readily distinguished by "feel", and their indentation relative to the right-cylindrical contour provides opposed surfaces that are adapted to be engaged by and between the thumb and opposed finger F, such as the forefinger of one hand as seen in FIG. 3, in their natural pinching attitude.

The arrangement shown has been found to provide a most convenient and easily operable apparatus that permits pinching of the wall portions 38 toward each other and against the flexible and resilient nature of the material of spout 22 so as to yield a very precise type of dispenser for dispensing minute portions of the liquid that enters cone 32 when the device is inverted. The restricted bore 36 prevents flow therethrough if the vial 10 is merely inverted, but upon additional pressurizing of the fluid by pinching together the pinch-surfaces 38, controlled expressing of liquid through restricted bore 36 is easily effected. At the same time, the operator gets an enhanced sense of "feel" by the opposed forces from the two pinching fingers, an effect that was not intended to be achieved in prior constructions.

In experimenting with the improved dispenser above described, for use in dispensing of a relatively highly active biological such as smallpox vaccine, it was discovered that upon removing the dispenser from a refrigerated space and placing it in the room preparatory to vaccinating, very soon thereafter a small amount of active smallpox vaccine automatically was expressed from the dispenser tip 34. Upon investigation of this undesirable factor it was discovered that the apex angle adjacent tip 34 was so small, that after one use a portion 40 of the liquid was retained at the apex as seen in FIG. 2. The liquid portion 40 remained there when the vial was returned to the refrigerated space pending the next usage. Then, upon later removal, the heating of air or gas in the vial 10 and in dispenser 20 automatically operated to force a part of liquid portion 40 from the tip 34.

The foregoing problem was resolved by providing a minute gas vent hole 42 in the wall of cone 32 located closer to annulus 22 than to tip 34, so that there was no opportunity of hole 42 being closed over by the liquid 40 held at the apex of the cone. The vent hole 42 operates to permit the heated and expanding gas to escape and avoids pressurizing the liquid 40. Preferably the hole 42 is located so that it extends through one of the pinch surfaces 38 adjacent the lower end of surface 38. By this arrangement, when an operator presses both pinch surfaces 38 as in FIG. 3, one finger automatically operates to close the vent hole 42 during the dispensing operation.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

I claim:

1. An improved drop dispenser of the type including storage container having a spout member of flexible resilient material that provides thereon a restricted drop-defining tip, said improved dispenser comprising, in combination: the spout member being generally conical and elongated and having at its distal apex end the drop-defining tip, and two opposed portions of the spout member intermediate the ends of the spout being flattened and indented toward each other relative to the projected conical configuration of the spout to define opposed pinch-surfaces that are distinguishable by feel and converge in the direction toward the drop-defining tip and are adapted to be engaged by and between the thumb and opposed finger of one hand, so as to provide for pinching of the spout to controllably express a drop of liquid from the drop-defining tip of the spout, the walls of the dispenser adjacent the drop-defining tip providing an apex angle that tends to retain liquid therein, a vent hole in said spout member located closer to the other end of said spout member than to said apex end of the spout member, so as to relieve expansion of gas within the storage container without discharging liquid retained in the apex angle through the drop-dispensing tip.

2. A device as in claim 1 wherein the vent hole is located through one of said pinch-surfaces to that upon manually engaging and pressing against both pinch-surfaces simultaneously the vent hole is automatically closed off.